United States Patent [19]

Lykes et al.

[11] Patent Number: 5,068,556
[45] Date of Patent: Nov. 26, 1991

[54] BEARING BRACKET FOR A DYNAMOELECTRIC MACHINE

[75] Inventors: Robert E. Lykes; James L. King, both of Troy, Ohio

[73] Assignee: A. O. Smith Corporation, Milwaukee, Wis.

[21] Appl. No.: 404,095

[22] Filed: Sep. 7, 1989

[51] Int. Cl.$^5$ .................. H02K 5/16; H02K 7/08; H02K 15/14
[52] U.S. Cl. .................. 310/90; 310/42; 310/258; 310/89
[58] Field of Search .................. 310/42, 89, 90, 91, 310/40, 1, 258, 216

[56] References Cited

U.S. PATENT DOCUMENTS

| | | | |
|---|---|---|---|
| 1,780,339 | 11/1930 | Canton | 310/258 |
| 2,462,204 | 2/1949 | Ludwig | 310/258 |
| 3,200,275 | 8/1965 | Lindgreen | 310/90 |
| 3,508,327 | 4/1970 | Diederichs et al. | 29/596 |
| 3,609,427 | 9/1971 | Lautner | 310/258 |
| 3,671,790 | 6/1972 | Widstrand | 310/216 |
| 3,694,909 | 10/1972 | Hallerback | 29/596 |
| 3,701,911 | 10/1972 | Hallerback | 310/90 |
| 3,717,779 | 2/1973 | Hallerback | 310/90 |
| 3,720,914 | 3/1973 | Hallerback | 310/90 |
| 3,740,598 | 6/1973 | Hallerback | 310/89 |
| 3,836,802 | 9/1974 | Parker | 310/154 |
| 3,858,070 | 12/1974 | Hallerback | 310/90 |
| 3,866,071 | 2/1975 | Hallerback | 310/90 |
| 3,873,861 | 3/1975 | Halm | 310/43 |
| 3,894,256 | 7/1975 | Sholtz | 310/90 |
| 4,031,610 | 6/1977 | Singh et al. | 29/598 |
| 4,164,673 | 8/1979 | Mazzorana | 310/89 |
| 4,339,871 | 7/1982 | Magnaghi | 310/90 |
| 4,445,060 | 4/1984 | Ruhle et al. | 310/154 |
| 4,538,084 | 8/1985 | Kawada et al. | 310/217 |
| 4,544,856 | 10/1985 | King | 310/71 |
| 4,557,041 | 12/1985 | White et al. | 29/732 |

FOREIGN PATENT DOCUMENTS

| | | | |
|---|---|---|---|
| 0184724 | 6/1986 | European Pat. Off. | 310/91 |
| 2426688 | 4/1975 | Fed. Rep. of Germany | 310/90 |
| 2156004 | 6/1979 | Fed. Rep. of Germany | 310/90 |
| 0170250 | 7/1986 | Japan | 310/90 |

*Primary Examiner*—Steven L. Stephan
*Assistant Examiner*—C. LaBelle
*Attorney, Agent, or Firm*—Andrus, Sceales, Starke & Sawall

[57] ABSTRACT

A frameless motor includes a laminated annular stator core having an internal bore and a winding projecting from the ends. The bore is enlarged in the end laminations with an annular diameter precisely defining the bearing axis. Cup-shaped bearing supports have precisely formed ends complementing the enlarged bore with an axially spaced bearing wall. the rotor is supported in the bearing supports to support and align the rotor with an air gap to create a complete and framelss dynamoelectric machine which can subsequently be assembled to any suitable support or housing. A cup-shaped cylindrical housing with the outer end machined to a stepped recess has an internal diameter substantially corresponding to the inner bore of the stator core and an outer nominal diameter complementing the internal enlarged bore. Alternatively, the cup-shaped bearing support is formed with a cylindrical housing having an end flange which is precisely machined to the bearing opening and the enlarged bore.

17 Claims, 3 Drawing Sheets

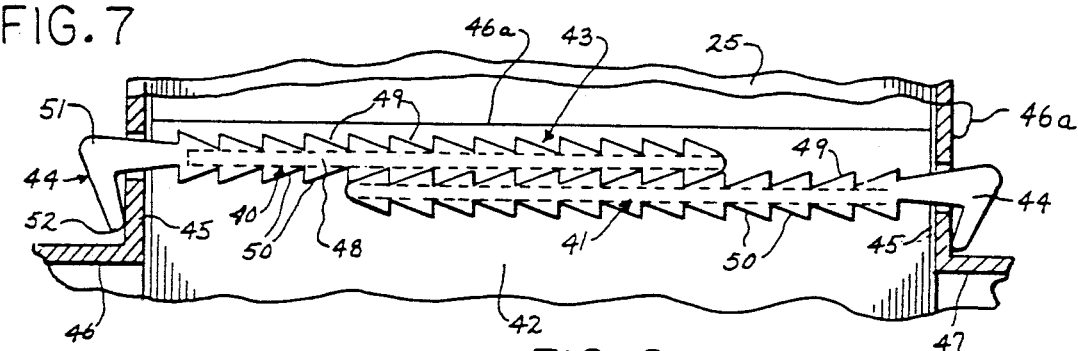
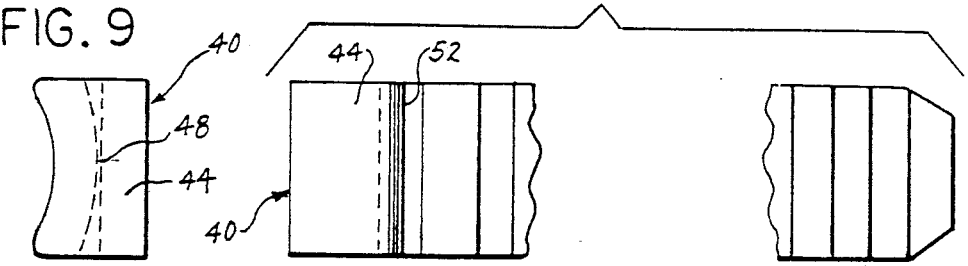
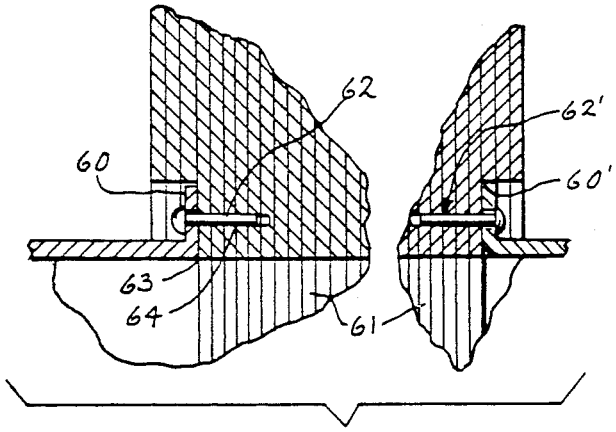
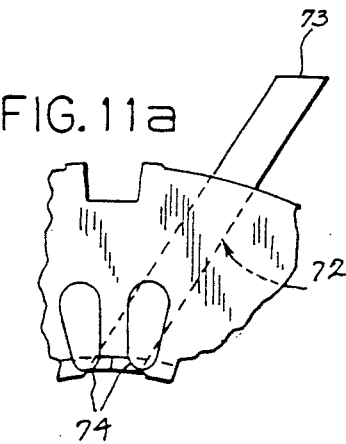
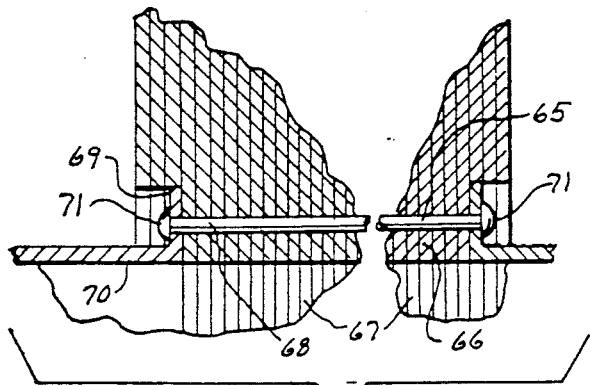
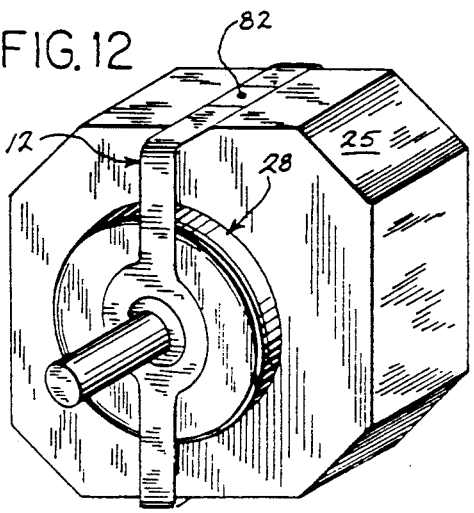

BEARING BRACKET FOR A DYNAMOELECTRIC MACHINE

BACKGROUND OF THE PRESENT INVENTION

This invention relates to a dynamoelectric machine and particularly to an electric motor adapted to be mounted within a separate enclosure.

In various electrical applications, a rotary dynamoelectric machine, such as a rotary motor, is used as a drive mechanism. In certain applications, a motor is mounted within a separate housing such as a fan housing with the motor shaft coupled to drive a fan blade. The motor includes an outer annular stator unit of any known or suitable construction. A rotor unit is rotatably mounted within the stator. A standard conventional motor will include an annular stator core of the stator unit fixedly mounted in any suitable manner within an heavy outer tubular motor frame. The frame projects axially from the ends of the stator core beyond the ends of the stator winding. The ends of the frame are machined and corresponding machined end plates are interconnected to the ends of the motor frame as by through bolts or other securement devices. Rotor bearings are secured one each within each of the end plates in appropriate alignment. The rotor shaft is journaled in the bearings with the rotor core aligned with the stator core. The frame and end frames enclose the electrical winding as well as providing necessary structural strength to support the rotor unit within the stator unit. The machined frame ends and end plates accurately locate the bearings to support the rotor core and the stator core with an air gap therebetween to permit free rotation of the rotor core. In rotating electric motor, the air gap between the rotor core and the stator core must be maintained within specified clearance limits. In many applications, efficient motor design requires minimizing of the air gap between the stator and the rotor.

Strong magnetic forces are created between the cores of the stator unit and the rotor unit, and a substantial frame is necessary to hold and maintain the necessary air gap between the rotor core and stator core. In addition, radial side loads may be applied to the shaft by the driven load creating even larger forces on the rotor support structure. The magnetic forces plus the radial side load forces can result in bearing radial loads of several hundred pounds which requires rigid bearing supports, and a corresponding supporting frame, to firmly support the rotor within the stator without danger of the rotor bridging the air gap and damaging the members.

In many applications, the motor frame is not necessary because the motor is housed within a separate housing. The standard motor with the motor frame can be used. In those applications however, a frameless motor can be used wherein the stator unit can be mounted directly to the frame or a mounting base of the driven element. The rotor unit is then appropriately supported by appropriate bearing structures interconnected to each other and/or to the driven element support structure.

Although frameless motors have been suggested in the prior art, relatively complex and costly bearing support structures for the rotor and the supporting bearing assembly is provided. Further, each application generally requires a custom bearing support structure.

The prior art patents thus disclose various motor structures including separate stator units and enclosed rotor units. For example, U.S. Pat. No. 4,244,099 which issued Jan. 13, 1981 discloses an electric motor adapted to be mounted as a part of a gear train housing. The motor consists of an outer annular stator unit within an outer main frame and a separate enclosed rotor unit which extends through the stator and extends therefrom for mounting of the rotor with a press fit within an opening in the gear frame. The rotor is supported by the opening in the base wall of the housing while the stator unit is supported and located within an enlarged recess in the housing. U. S. Pat. Nos. 4,598,218 and 4,510,679 disclose similar high speed rotors where the rotor core and winding is protected by an encircling protective shell which closely fits and is secured about the core. Special shaft units project outwardly from the opposite ends of the core for mounting in separate bearing assemblies mounted in separate supports of the outer enclosure structure.

There is a need for a relatively simple but reliable and effective frameless motor construction having an integrated support for the rotor which will establish and maintain the designed running air gap over the useful life of the dynamoelectric machine.

SUMMARY OF THE PRESENT INVENTION

The present invention is related to a frameless motor having a specially formed stator unit for receiving and supporting integrated bearing support units for rotatably supporting of the rotor unit within the stator unit. Generally, in accordance with the present invention, the stator unit includes an annular stator core having a precisely formed internal bore and a winding projecting axially from the opposite end of the core. The ends of the stator core include similar enlarged bores defining circumferential recesses or notches immediately continguous and an extension of the stator bore. End bearing supports have precisely formed ends complementing the notches and firmly secured within the notches. The supports project outwardly and include axially spaced bearing walls or members spaced from the ends of the stator core.

In assembly, the rotor unit is supported within the end bearing members with the rotor core accurately aligned with the core and with the desired air gap to create a complete and frameless dynamoelectric machine which can subsequently be assembled to any suitable support or housing.

More particularly, in one embodiment the bearing support includes a cup-shaped cylindrical housing with the outer end machined to a stepped recess having an internal diameter substantially corresponding to the inner bore of the stator core and an outer nominal diameter complementing the internal enlarged diameter of the mounting notch in the stator core. The end of the housing is machined to abut with the exposed lamination of the notch in the end of the stator core. The support is welded or otherwise secured to the stator core and projects axially outwardly therefrom to define the sole support for the shaft bearing and the interconnected rotor unit.

In an alternate embodiment, the cup-shaped bearing support is formed with a cylindrical housing having an end flange. The flange is precisely machined to the bearing opening and the notched stator core in which the notch is formed to precisely match to the flange.

The motor of this invention overcomes many of the disadvantages and objections presently associated with the specifications requiring frameless electric motors or other dynamoelectric machines. Although shown and uniquely adapted to electric motors, it is obviously equally applicable to any other dynamoelectric machines having similar requirements and applications.

The present invention provides a low cost, effective self-contained frameless motor which can be readily produced in various sizes and with various bearing specifications. The motor requires only standard well known technology and materials and is thus particularly adapted to commercial implementation.

BRIEF DESCRIPTION OF THE DRAWINGS

The drawings furnished herewith illustrate a preferred construction of the present invention in which the above advantages and features are fully explained hereinafter.

In the drawings:

FIG. 7 is a reflection of the illustrating pair of overlapping securing members shown in elevational side view;

FIG. 8 is a bottom elevational view of one element shown in FIG. 7;

FIG. 9 is an end view of the securing element shown in FIG. 8;

FIG. 10 is a sectional view illustrating a peg securement of a bearing module to a stator unit;

FIG. 11 is a view of an elongated member extended through a stator opening and end modules for securing the bearing modules to the stator;

FIG. 11a is a suplified pictorial view illustrating a clamping wire for securing of an end module to a stator unit; and FIG. 12 is a pictorial view of a stator with an encircling clamp strap member for securing of the bearing modules to a stator.

DESCRIPTION OF THE ILLUSTRATED EMBODIMENT

Figure 1:
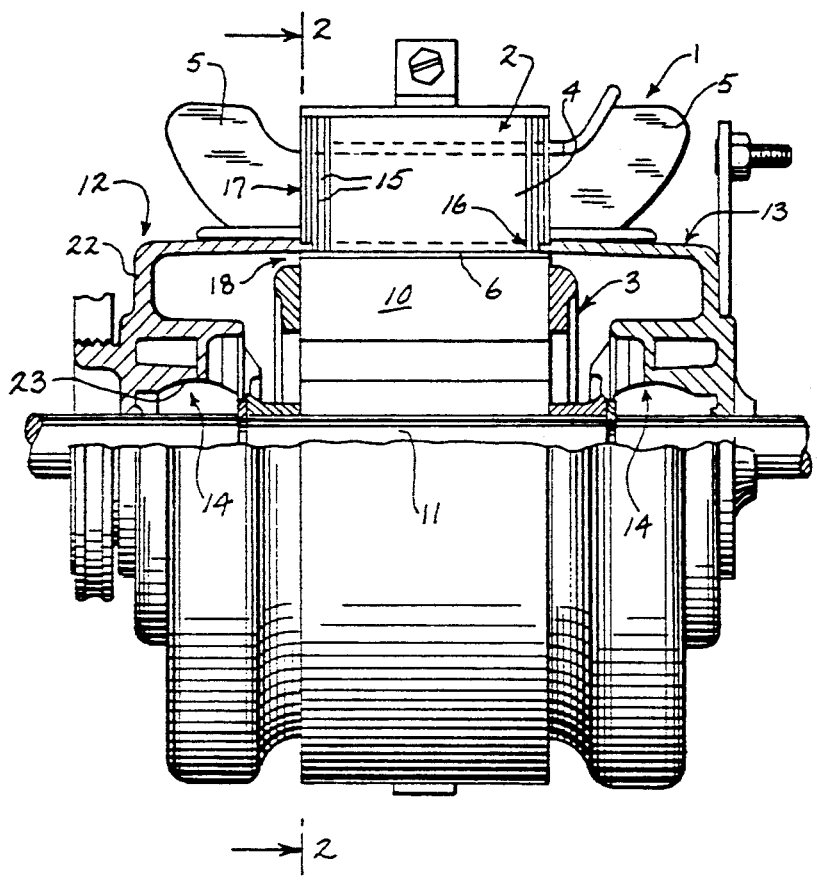
FIG. 1 a side elevational view of a frameless electric motor illustrating one support in accordance with invention.

Referring to the drawings and particularly to FIG. 1, a frameless electric motor 1 is illustrated including an outer annular stator unit 2 with which a rotor unit 3 is mounted to the opposite ends of the stator unit 2. The stator unit 2 includes an annular core 4 with a winding 5 wound on the inner peripheral face thereof in accordance with conventional practice and defining a clear axial opening or bore 6 through the stator core 4. The rotor unit 3 includes a rotor core 10, with a suitable internal winding, not shown, mounted on a shaft 11. The shaft 11 extends from the opposite ends of core 10 and is mounted in special end bearing supports 12 and 13 secured to the opposite end faces of the stator core 6. Each of the end bearing supports includes a similar rotary bearing unit 14 with the corresponding end of the shaft 11 journalled therein. The rotor unit 3 is appropriately balanced for rotation within the bearing units with an appropriate air gap between the stator core the rotor core.

The present invention is particularly directed to the structure and method of mounting the rotor bearing supports directly to the stator core. The stator unit and the rotor unit as such can otherwise be constructed with any suitable known or desirable construction and such parts are not therefore further described other than as necessary to a clear and full understanding of the illustrated embodiment of the present invention.

Figure 3:
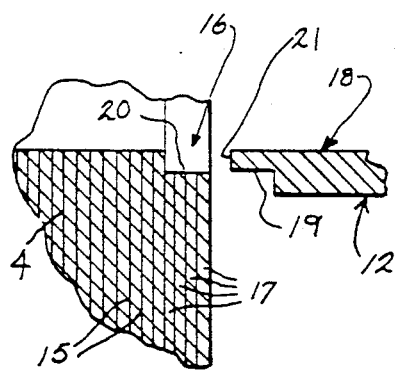
FIG. 3 is an exploded fragmentary view illustrating the rotor and bearing support mounting.
Figure 2:
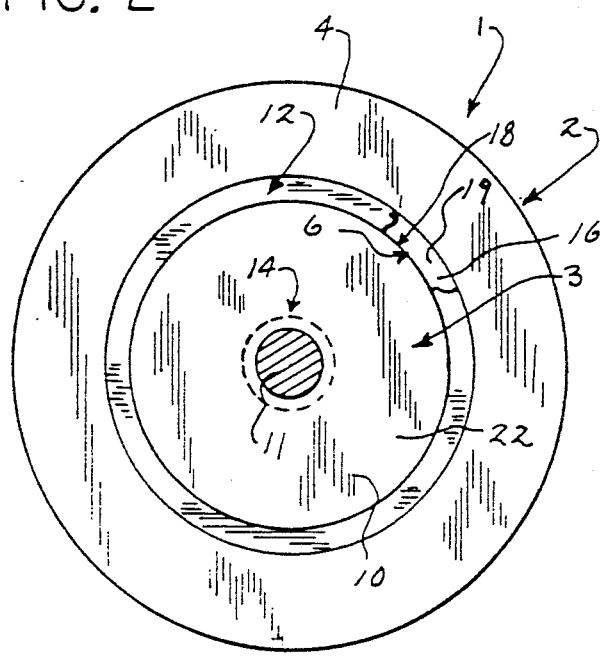
FIG. 2 is a vertical section taken generally on line 2—2 of FIG. 1.

Referring particularly to the drawings including FIG. 1, the stator core is constructed as a annual member having the accurately formed constant diameter bore 6. The core 4 is a laminated core constructed of a plurality of flat like laminations 15 intimately secured in abutting stacked relation in accordance with known constructions. In accordance with the teaching of the present invention, the opposite end faces of the stator core 4 are uniquely constructed with end notches 16 forming enlargements of the stator bore 6 for mounting of the bearing support members 12 and 13 to the stator core 4. More particularly with reference to FIG. 3, which is an enlarged fragmentary illustration of the one end of the stator core 4, the stator core 4 is formed with a secondary enlarged diameter notch 16 by a plurality of the end laminations 17, and particularly in the three end laminations 17.

The stator bore 6 is accurately formed to a precise dimension and the enlarged bore in the end exposed lamination is similarly precisely formed to form notch 16 with precise related surfaces.

The bearing support 12 and 13 similarly is a generally cup-shaped cylindrical support with reference to support 12. The outer edge 18 of the cup-shaped support 12 is a precisely and accurately formed end projection as complementing the notch 16. As most clearly shown in FIG. 3, the end may be formed as a machined outer end with a machined circumferential peripheral outer surface 19 to precisely match the diameter 20 of the enlarged bore or notch 16. The end surface or edge 21 of the projection is machined to a flat planar surface to abut the end most lamination 17 within the notch 16. The machined end projection 18 then accurately fits within the recess or notch 16, with the end edge 21 abutting the exposed full bore lamination 17 and the peripheral surface 19 abutts the enlarged bore of the notch 16 in the stator core.

The end support 12 is secured to the adjacent lamination 17 in any suitable manner. Thus, suitable spot welds can be provided along the external corner connection between the outer most lamination and the adjacent circumferential surface of the bearing support 12. The bearing support 12 is thus rigidly interconnected to the stator core 4 and forms a precisely located annular or axially projected support or bracket for the bearing 14.

The end plate 22 of the cup-shaped support 12 is precisely located with respect to the end machined edge 21 of the support 12. The central bearing opening 23 is formed with a precise concentricity with respect to the machined outer surface 19 of the support. With the bearing 14 appropriately supported within the concentric opening 23, the axis of the rotor shaft 11 and therefore of the rotor core 10 is precisely located within the bore 6 of the stator core 4.

Figure 4:
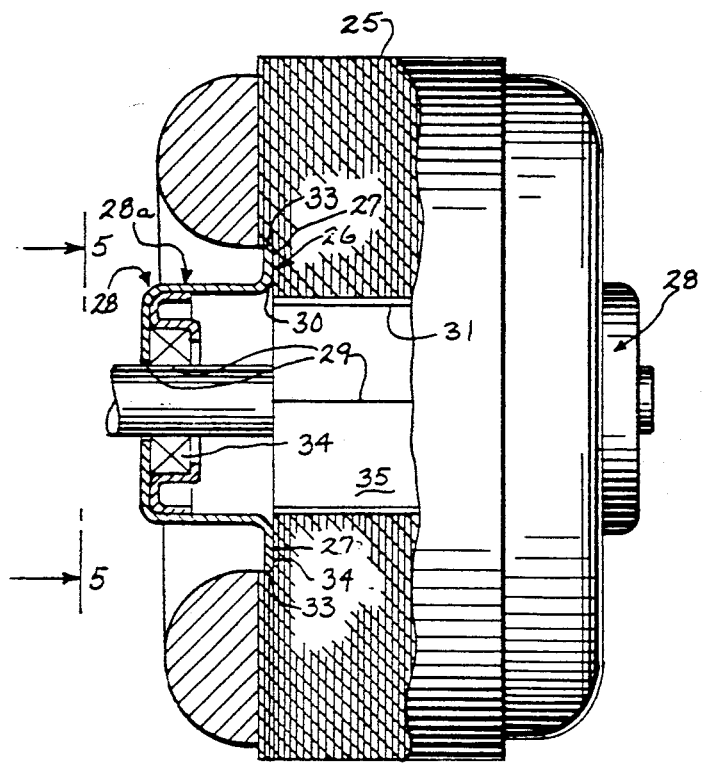
FIG. 4 elevational view similar to FIG. 1 illustrating an alternator embodiment of the present invention.
Figure 6:
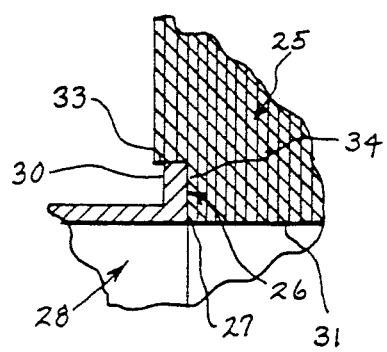
FIG. 6 is an enlarged view of the rotor and bearing support mounting.
Figure 5:
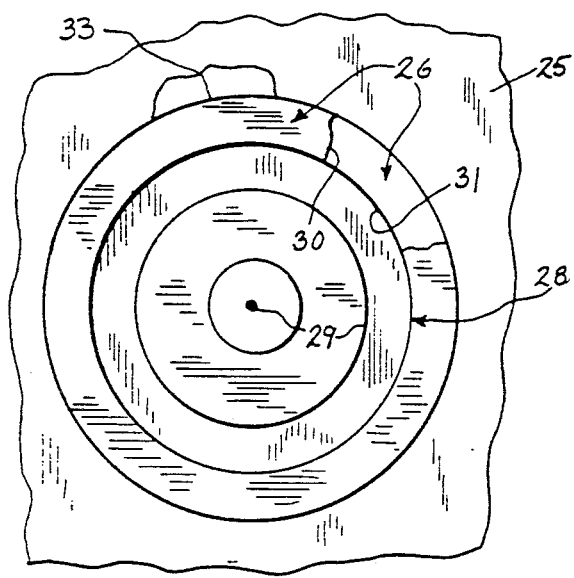
FIG. 5 is a view taken generally on line 5—5 of FIG. 4.

An alternate embodiment is illustrated in FIGS. 4-6. In the alternate embodiment, the end of the stator core 25 is similarly formed with an accurately formed mounting notch 26. In the alternate embodiment, the radial length of the notch 26 is increased to provide a significantly greater exposure of the exposed inner lamination 27. In the alternate embodiment, a cup-shaped bearing support 28 is again provided. The cup-shaped support includes a cylindrical outer housing 28a with a bearing opening 29 which terminates in the outer edge in an outwardly extended flat flange 30. The inner diameter of the support 28 and flange 30 corresponds to the internal diameter of the stator bore 31. The flange 30 projects radially outwardly on a common radial plane. The outer edge 33 of the flange 30 is machined, die cut or formed such that the radial dimension of the flange matches the radial length of the enlarged notch 26. The end face 34 of the flange 30 is machined or otherwise precisely formed to define a planar surface precisely perpendicular to the axis 29 of the bearing opening in support 28. The machined outer edge 33 has a constant diameter precisely complementing the internal diameter of the mounting notch 26 and particularly the bore formed by the exposed or enlarged laminations. The cup-shaped bearing support 28 is secured within the notch 26 and again defines a very precise and accurate orientation and location of the bearing axis with respect to the stator bore. With known mounting of a rotor bearing 34 and a rotor construction, the rotor core 35 is again very precisely located within the stator core 25 to establish and maintain a precise minimal air gap between the stator core and the rotor core.

Each end bearing module 28 must be securely affixed to the stator core 25 with the flange accurately and firmly seated within the precisely formed recess or rabbits 26 in the end of the stator core. In this manner, the location of the precisely formed flanged bearing module or structure in combination with the precisely formed oversized lamination bore 31 establishes the proper air gap 36 between the stator bore and the outer diameter of the rotor. This clearance must be, as previously noted, accurately established and maintained. In a practical application, the air gap is desirably held as close to one half the difference between the diameter of the bore and the outside diameter of the rotor. In many electric motors, the air gap should be approximately 0.012 inches. Thus, the retention method for the bearing modules should be such as to securely and accurately support the end bearing units and thereby establish this minimum air gap.

Although any suitable means may be employed depending upon the material of the end bearing modules and the like, various preferred systems have been developed by the inventors. The bearing module is conveniently formed of a stamped steel, a molded plastic or cast aluminum with present day technology. The following methods provide various means to accurately locate and secure the flange bearing module to the stator.

In FIG. 7, securement pegs 40 and 41 are inserted from the opposite ends of the stator core 25, with the pegs passing through a opening 42 to the stator slot and into overlapping securing engagement with each other, as at 43. Each peg has latch head 44 and 44' abutting the flange 45 of the bearing modules 46 and 47. As more clearly disclosed in FIGS. 7-9 and with referent to peg 40 for description, the peg 40 is formed as a spike-type member having a shank 48 with sawtooth projections 49 and 50 on each side of the shank. Corresponding elements of spike 41 are identified by primed numbers. The overlapping of the shanks 48 within the stator slot opening results in a mutual interengagement of the teeth projections as in FIG. 7, with teeth 50 of peg 40 engaging teeth 49' of peg 41. The interlocking pegs securely locks spikes or pegs to each other.

The spike-like pegs by appropriate curved shaping of the shank 44 as shown in FIG. 8 may also constitutes a winding slot wedge for holding of the stator winding 46a within the slot. The location of the teeth to both sides of shank 48 permits the use of identically formed pegs 40 and 41 from the opposite sides of the stator core 25 with the sawtooth overlapping and interlocking. The modules are assembled with the stator and the pegs 40 and 41 driven into the stator slot opening from the opposite ends and direction to the effect the desired interaction and fastening. The latch head 44 is preferably formed with a resiliency to establish a spring action during the assembly. In the illustrated embodiment, the latch head 44 is attached to the shank as at 51 and projects at an angle over the shank. The outer end 52 thus engages the flange with the head flexing about the connection 51 to the shank. Top peg 40 is inserted further than necessary to effect engagement of the head end 52 and at least until the next set of teeth interlock to thereby deform or deflect the latch head 44. The latch head then resiliently engages the module flange 45 and exerts a constant holding force on the flange.

At least two sets of securement peg units spaced 180 degrees would be required, to secure the bearing modules in place. However, it is recommended that at least three equicircumferencially spaced peg pairs be applied, and generally four equicircumferentially sets are desirable to maximum mechanical holding integrity. Any number greater than four can be used if deemed necessary.

The nailing effect establish by the forced interengagement of the head 44 and 44' on the opposite side of the stack of laminations also tends to compensate for any variation in the stator stacked length, and generally should produce a control within two laminations thicknesses. The spike-like pegs 40 and 41 can be formed of any suitable material including a molded plastic to provide a cost effective fastening assembly. The spring-head construction also adapts the fastening system to stators of different stack lengths, with shanks configured to the slot design.

Although the modules are described as preassembled, the fasteners can be preassembled to the stator core with the bearing module subsequently telescoped over the latch head. Thus, the spring action permits deforming of the heads 44 and 44', mounting of the module and then release of the latch heads which spring back into an original locking position.

An alternative structure is shown in FIG. 10 wherein a bearing module flange 60 is pegged directly into the end face or a stator core 61. Circumferentially spaced holes 62 are provided in the end laminations and in particular the end tooth face of the rabbet or recess 63. The holes 62 are placed in a location which least effects the flux density. Each hole location is preferably provided with a plurality of holes 62, shown as three radially spaced within the stator tooth. The bearing flange 60 has openings 63 appropriately located to mate with the core holes 62. A nail or peg 64 is press fitted into the aligned stator hole 62 and opening 63 to provide a firm securement of the module flange within the recess. Again, accurate location of the securement holes 62 as well as the use of an appropriate securement member 64 establishes a tight secure fit with accurate location of the bearing module.

A further method of securing the end members is shown in FIG. 11 wherein an elongated securement element 65 is passed through the stator slot openings 66 of a stator core 67 and appropriate holes 68 in the flange 69 of the bearing modules 70, which are appropriately aligned with the slot openings. In the embodiment of FIG. 11, the element 65 is shown as a wire extending through the stator slot opening to insure that the wire does not project inwardly of the stator bore and thus into possible rubbing engagement with the external surface of the rotor, not shown. The wire 66 securement can take various configurations. Thus, a single strand of solid wire provided with heads 71 can be used, with the heads abutting the bearing flange. An extended single wire-like member could also be formed as a plastic pin element with clamping heads ultrasonically formed after assembly.

The individual securement element with opposite end heads may be a cotter-key or rivet unit passed through the one bearing module and stator with the outer end passed through the opposite bearing module and then secured in place by deforming of the outer end of the cotter-key or rivet. The wire in adjacent slot openings can be extended and interconnected or alternatively a single C-shaped wire 72 having a closed end as shown at 73 can be formed projecting through the slot openings from one end. The opposite extended ends 74 of the C-shaped wire are interconnected to each other in any suitable manner. The ends 71 are shown wrapped together and bent over adjacent the stator core. Alternatively, the free ends may be bent over into abutting engagement with the end of the stator or into notches in the stator. The C-shaped 72 wire can be made to span any number of slot openings or through adjacent openings. The extended single wire member could also be formed as a plastic pin element with the ends ultrasonically formed after assembly.

In an alternate construction, a latch ring is suitably mounted to an end face of the core, with a plurality of latch members on the ring projecting into clamping engagement with the flange. The ring is secured to the stator in any suitable manner as by chemical bonding, welding, staking or the like.

Other structures which can be employed would include, as previously noted, chemical bonding of the flange within the rabbet.

A further modification to the illustrated embodiment of the invention, the end laminations of the stator stack are molded from a suitable plastic with an accurately molded rabbet diameter which is used to align the bearing module for the air gap control. A latch mechanism is molded directly onto the inside diameter of the special plastic end laminations which will deflect outwardly to resiliently engage the bearing modules or bearing flange.

Finally as shown in FIG. 12, an external encircling member 80 can encircle the frameless motor, such as shown in FIG. 4, and including the bearing module 28 and stator 25 with the encircling member 80 firmly capturing the modules 28. In the illustrated embodiment of the invention, member 80 is a strap having spaced ring members 81 abutting the bearing plates of the bearing modules 28. The strap 80 is axially wrapped about the motor with free ends which are drawn together and secured in any suitable manner with a metal strap, the ends may be spot welded as at 82 to firmly and reliably secure the bearing modules in position. The encircling member 80 can be formed of any suitable steel, plastic, composite material such as a fiberglass and resin, with or without other strengthening components, or other suitable strength materials. The member can be formed as a suitable flexible member or a preformed member appropriately assembled.

In any securement construction, the member(s) create a sufficient axial force on the bearing modules to hold the bearing modules securely within the end locating recess or rabbets.

The present invention thus provides a four piece frameless motor having the stator, rotor and two end bearing frames which can be constructed and assembled with present day technology and mass production processes to produce a cost effective product.

Thus, the present invention is particularly directed to the structure of a bearing support fitted within a recessed or notched portion of the stator core immediately adjacent the bore of the stator. The notched stator bore and the end of the bearing support are precisely formed to define an accurate reference with respect to the concentricity of the stator bore. By appropriately forming of an integrated bearing opening support with respect to the precisely formed end of the bearing support, the appropriate and precise mounting of the rotor unit is established at the factory. The system avoids the necessity and difficulty in providing an accurately located support separate from the motor structure as such as well as eliminating the need for a conventional motor frame, with the concentricity difficulties presented in such structures. Various modifications based on the illustrated embodiments and teaching set forth herein can be readily provided within the scope and teaching of the present invention.

Various modes of carrying out the invention are contemplated as being within the scope of the following claims and particularly pointing out and distinctly claiming the subject matter which is regarded as the invention.

We claim:

1. In a motor structure including a rotor core mounted within the bore of an annular stator core having a constant diameter bore opening and with an operative air gap between the stator core and rotor core, said rotor core mounted on a shaft projecting coaxially from opposite ends thereof with an axis to establish said air gap and having an outer cylindrical surface, the improvement comprising said stator core including a stack of laminations including end laminations having an enlarged bore defining a recess at each end of the stator core, the outer circumference of said enlarged bore being precisely formed with an axis coincident with the axis of said shaft, cup-shaped bearing support members secured one each to the opposite ends of said stator core and having outer end plates, a bearing unit in each of said end plates located on the axis of said stator core and supporting said shaft to define a self-contained rotor unit, said support members having precisely formed outer ends complementing said stator core recesses, and securement means connected to said support members and said core at sad recesses to secure said support members within said stator core recesses and thereby support said bearings and rotor unit.

2. In the motor structure of claim 1 wherein each said bearing support member includes a radial end flange projecting radially outwardly of said bearing support member, said flange having a continuous outer edge formed to precisely complement said stator core recess.

3. The apparatus of claim 2 wherein an external strap member is wound axially about the stator and said bearing support members and includes end members bearing on the exterior axial ends of the bearing support members, said strap member generating axial holding forces on the bearing support members sufficient to secure the bearing support members within the recesses.

4. The apparatus of claim 2 wherein said stator core is formed with securement holes within stator teeth forming the inner radial wall of said recesses, said flange having circumferentially spaced openings aligned with said holes in said teeth, and securement element passing through the flange opening into the stator hole and locking of the flange within the recess.

5. In the apparatus of claim 2 wherein said stator core includes a plurality of circumferentially spaced slot teeth defining stator slots, said securement means connected to said support member and said core at said recesses to secure said separate members including a plurality of corresponding securement units interconnecting said support members within said recesses, each of said securement units including an elongated unit projecting through said stator slots and extending outwardly of said end flange, said securement units including outer members secured to said elongated unit and abutting the flange and firmly securing said bearing units with said flange fixedly secured within said recess.

6. The apparatus of claim 5 wherein each said securement units is an elongated member having clamping heads on the opposite ends thereof abutting the radial end flanges to secure the bearing support members within said recesses.

7. The apparatus of claim 5 wherein each said elongated unit includes a first peg member and a second peg member extending respectively from the opposite ends of said stator, said first and second peg members having overlapping end portions within said stator slot with said overlapping end portions having opposed interengaging teeth members to securely interlock said first and second peg members too each other and effectively form a continuous member extending through said stator slot.

8. The apparatus of claim 7 wherein said first and second peg members each includes an outer end latch members resiliently interconnected to the end of the peg member, and said end latch members resiliently engaging the flanges to resiliently and firmly affix the bearing units within said recesses.

9. An apparatus for securing end bearing units to a stator core having axial end faces and having a stator bore and inner winding slots separated by teeth in said stator bore, comprising first and second bearing modules each having a bearing unit and having an outer mounting flange, said stator bore including enlarged end recesses formed within the axial end faces of the stator core, said bearing unit located one each to the opposite end of the stator core with said flanges within said recesses, an elongated attachment unit, each attachment unit projecting through a stator slot opening and outwardly of the stator bore and secured to said bearing modules and securing said bearing modules with said flanges fixedly secured within said recesses, each said elongated unit includes a first peg member and a second peg member extending respectively from the opposite ends of said stator, said first and second peg members having overlapping end portions within said slots with said overlapping portions having opposed interengaging teeth members to securely interlock said first and second peg members to each other and effectively form a continuous member extending through said stator slot and having outer end latch members, and said outer latch members resiliently engaging the bearing units to resiliently and firmly affix the modules within said recesses.

10. The apparatus of claim 9 wherein said first and second peg members each include a generally curved strap-like shank with the curvature corresponding to and mating with the curved configuration of the stator winding in the slot opening too engage and hold the winding in place, the outer end off each said peg member having a bearing module latch, said bearing module latch being integrally joined to the peg member with a resilient interconnection whereby said end of said latch member resiliently engages the outer mounting flange within said recess to firmly secure the flange in place.

11. A dynamoelectric machine, comprising an annular stator having a cylindrical core including a central bore of a constant diameter, said stator core includes a stack of like laminations secured to each other to form said core, and said like laminations including a plurality of laminations at each end of said core having enlarged bores defining annular recesses, a rotor unit including a magnetic rotor core mounted on a supporting shaft, a first end bearing unit secured to a first end of said stator core and a second end bearing unit secured to a second end of said stator core, each of said bearing units including a finished annular end complementing and secured with the annular recesses in the bore of said stator core, said shaft journaled in said bearing units and establishing essentially the sole support of said rotor unit and thereby defining a self-contained operative dynamoelectric machine.

12. The machine of claim 11 wherein said stator core includes a plurality of circumferentially distributed winding slots with separating stator teeth extending outwardly from said central bore, and securement devices extended through said slots and secured to said bearing units to fix the bearing units in said recesses.

13. The dynamoelectric machine of claim 11, wherein said stator core has winding slots and teeth in the stator, said teeth in the recesses including at least one generally axially extended hole, said bearing units including integral support members having an end flange abutting said teeth with a securement opening aligned with said hole, and a securing element driven through said securement opening into said hole to fix the bearing units to said stator core.

14. The machine of claim 11 wherein each of said first and second .end bearing units includes a cup-shaped bearing support member having an outer edge secured one each to the opposite ends of said stator core and having outer end bearing plate, and a bearing secured in each of said end plates located on the axis of said stator core and supporting said shaft to define a self-contained rotor unit.

15. The machine of claim 14 wherein said bearing plates are flat members in a plane normal to the axis of the shaft.

16. The machine of claim 14 wherein each said support member includes a flange having precisely formed outer edge complementing said stator core recesses and secured in mating relationship within said stator core recesses to support said bearings and rotor unit.

17. The machine of claim 16 wherein said flange is machined in accordance with the stator core recesses.

* * * * *